United States Patent [19]

Walsh

[11] Patent Number: 4,560,045

[45] Date of Patent: Dec. 24, 1985

[54] TRANSMISSION CONTROL SYSTEM FOR A TRANSMISSION HAVING INPUT SHAFTS CLUTCHED TO A POWER SOURCE

[75] Inventor: John P. Walsh, Madison Heights, Mich.

[73] Assignee: Ford Motor Company, Dearborn, Mich.

[21] Appl. No.: 487,927

[22] Filed: Apr. 22, 1983

[51] Int. Cl.[4] .................... F16D 25/10; B60K 41/22
[52] U.S. Cl. .................. 192/3.58; 192/3.62; 192/87.19; 74/869
[58] Field of Search .......... 192/3.57, 3.58, 3.61, 192/3.62, 3.63, 87.13, 87.14, 87.16, 87.18, 87.19; 74/868, 869, 867, 335, 336 R

[56] References Cited

U.S. PATENT DOCUMENTS

| | | | |
|---|---|---|---|
| 3,664,470 | 5/1972 | Beech et al. | 192/3.57 |
| 3,667,577 | 6/1972 | Weymann | 192/3.58 |
| 3,906,817 | 9/1975 | Kreitzberg | 74/335 |
| 3,946,842 | 3/1976 | Siebers et al. | 192/3.58 |
| 4,219,109 | 8/1980 | Ushijima et al. | 192/87.13 |
| 4,406,356 | 9/1983 | Prince | 192/3.62 |
| 4,501,175 | 2/1985 | Tatsumi | 74/869 |

Primary Examiner—George H. Krizmanich
Attorney, Agent, or Firm—Frank G. McKenzie; Donald J. Harrington

[57] ABSTRACT

An automatic transmission having two torque input shafts is connected selectively to an engine through hydraulically actuated clutches. Each input shaft is associated with one of the clutches and with a first or a second group of gear ratios. A driveable connection is made between each input shaft and the gears of the associated gear ratios through operation of a hydraulic actuator. First and second control valves selectively connect the outlet of a hydraulic pump to the actuator in accordance with the position of a gear selector. When the actuators move the shifters to the gear ratio engaging position, the associated clutch is engaged and the other clutch disengaged. Electrical control circuit coordinates clutch engagement, actuator motion and control valve position.

15 Claims, 5 Drawing Figures

TRANSMISSION CONTROL SYSTEM FOR A TRANSMISSION HAVING INPUT SHAFTS CLUTCHED TO A POWER SOURCE

BACKGROUND OF THE INVENTION

1. Field of the Invention

This invention pertains to a control system for an automatic transmission, and more particularly relates to such a system for controlling the operation of clutches and gear shift actuators.

2. Description of the Prior Art

Preselective transmissions eliminate the need for hand shifting of sliding gear transmissions by permitting the vehicle operator to select for subsequent operation any of the gear ratios of the transmission and later to set the transmission for operation in that selected gear ratio. Shifting of the gears is accomplished either mechanically through a linkage connecting the clutch pedal to the shift lever of the transmission or by means of a solenoid or vacuum power unit that employs inlet manifold vacuum and a small lever, usually mounted on the steering post. The operator can select any gear other than the one in current use and then by momentarily depressing a clutch pedal, the change to the selected gear occurs spontaneously as the pedal is released.

A transmission that operated on this general principle produced the low forward speed from a simple planetary gearset, and the second and third forward speeds by compounding the various gear trains. For the fourth speed, or direct drive, a cone clutch was adapted to engage the brake drum of the third speed, whereby the entire gear assembly was locked together and rotated as a unit with the driving and driven shafts.

In this transmission, the brake for a selected gear was contracted on the drum by a spring force transmitted through the brake band and through a toggle mechanism. This mechanism included a lever bar or bus bar mounted on knife edges, to which an angular motion was imparted by the spring and which was connected to the gear pedal by a linkage. Gear change was made by depressing the pedal, which compressed the spring and released the band on the drum of the gear that has been in use. When the bus bar moved to the release position, the operating strut of the gear, which had been preselected, moved into engagement with the bus bar. When the vehicle operator then released the pedal and the brake contracted on the drum by the spring, the preselected gear ratio was made.

SUMMARY OF THE INVENTION

A tractor transmission may have first and second input shafts connected by first and second hydraulically actuated clutches to the engine. The shafts have journalled on their outer surfaces first and second groups of pinions, each group being associated with a clutch, an input shaft and a group of speed ratios. Shifters, driveably connected to each of the input shafts and movable axially along the shafts, each complete a driving connection between either of two pinions and the input shaft on which the pinions are journalled. The pinions are continuously in meshing engagement with output gears mounted on an output shaft directed parallel to the input shafts.

A system for controlling the operation of a tractor transmission of this type should operate such that the shifters engage the pinions associated with the respective input shaft before the clutch associated with that input shaft is engaged. The control system according to this invention produces this result by providing, in one form of the invention, first and second hydraulic circuits which pressurize first and second actuator means, each associated with the shifters of the corresponding input shaft. First and second control valve means connect the first and second actuator means to the discharge side of a hydraulic pump. When the actuators have moved the shifters into engagement with the selected pinion, a first hydraulic control circuit pressurizes that clutch whose engagement connects the engine to the input shaft with which the selected gear ratio is associated. When this clutch is pressurized, the other clutch is vented to a reservoir and the actuator associated with a second control circuit is moved to the neutral position. A clutch pedal is connected to clutch valves so that each of the clutches is vented to the reservoir when the pedal is depressed, each valve being biased by a spring to a position where, upon release of the pedal, the clutch communicates with its associated actuator means.

In one embodiment of the invention, each hydraulic circuit includes a pilot valve whose inlet is connected to the actuator outlet and whose outlet is connected to a pressure area of a valve that directs hydraulic fluid to the clutch of the other control circuit. The pilot valves operate at a first predetermined pressure of the clutch whose engagement is being made to drain the other clutch, at a second predetermined clutch pressure to release a detent enabling the control valve of the other control circuit to return to a neutral position, and at a third predetermined clutch pressure to open the inlet to the clutch associated with the unselected input shaft.

In a second embodiment of the invention, solenoids control the state of first and second control valves and first and second clutch valves. A double pole, single-throw switch located at each end of the range of travel of the actuators has normally open and normally closed terminals which change state when the associated actuator is moved far enough to engage its associated shifter. The switches open and close circuit branches to the various solenoids so that the logic permits the shifters to engage before the associated clutches engage, and the clutch and shifters associated with the gear ratio from which a shift is being made to remain engaged until the new gear ratio is established.

DESCRIPTION OF THE PREFERRED EMBODIMENT

Figures 1, 3A:
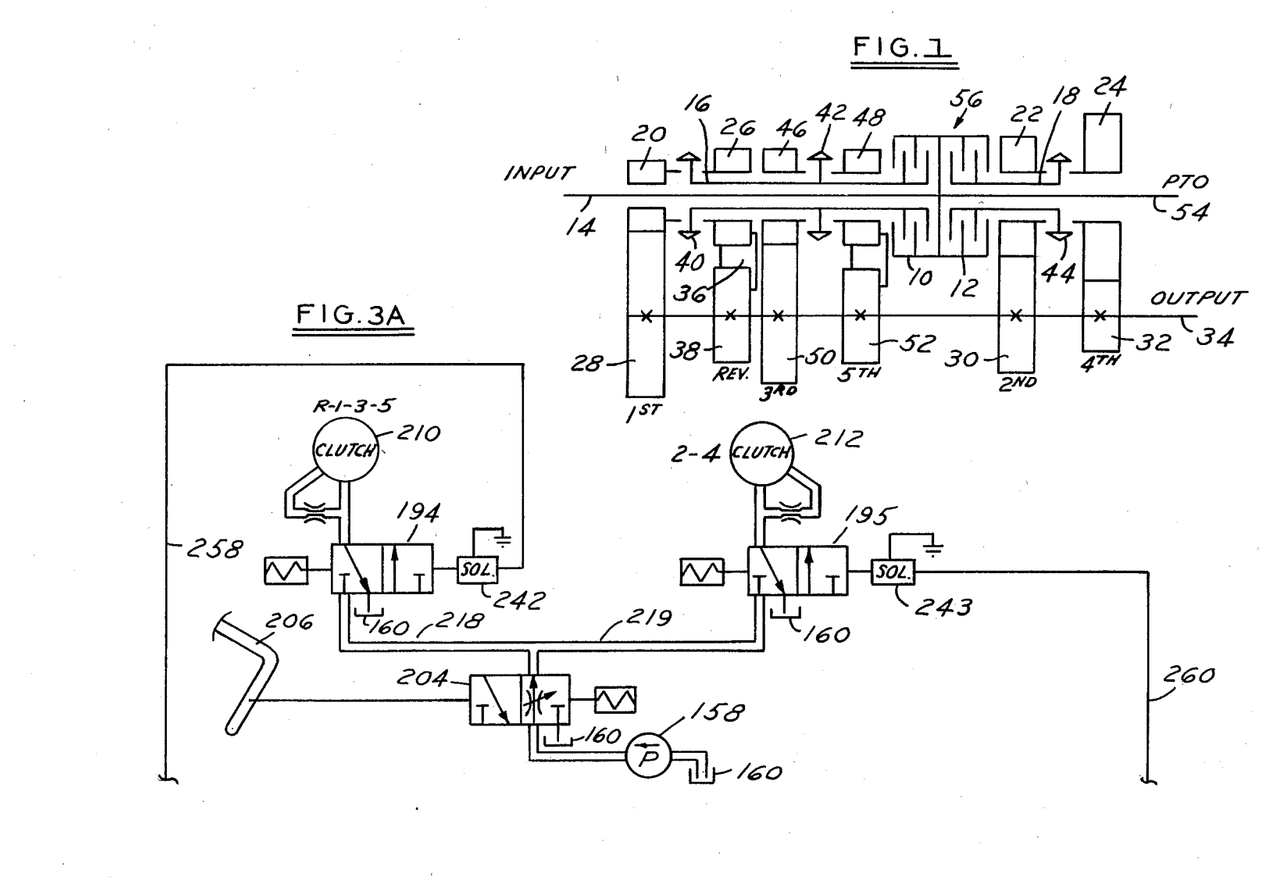
FIG. 1 is a schematic diagram showing the gearset, shifters, clutches and shafts of a multiple speed ratio transmission adapted for use with the present invention.
FIGS. 3A and 3B form a schematic diagram of a hydraulically actuated, electrically controlled system for operating a transmission such as that of FIG. 1.

Referring first to FIG. 1, an automatic automotive transmission has first and second clutches 10, 12 connected by a shaft 14 to an engine and is adapted to drive first and second input shafts 16, 18. Journalled on the outer surface of input shaft 16 and shaft 14 are forward drive pinions 20, 46 and 48, which are in continuous meshing engagement with gears 28, 50 and 52 that are formed integrally with or driveably connected to an output shaft 34. Reverse drive pinion 26 is in mesh with a reverse idler 36, which is in mesh with the reverse output gear 38 fixed to shaft 34. Pinions 20, 26, 46, 48 and gears 28, 38, 50, 52 are associated with a first group of gear ratios.

The shifters of the transmission 40, 42, 44, which may be synchronizers, shift collars, face splines or any mechanical couplers engageable by longitudinal movement, are driveably connected to the first or second input shafts and are adapted to move axially leftward and rightward in order to driveably connect the adjacent pinions to their associated input shafts. For example, the first speed ratio pinion 20 is driveably connected to input shaft 16 when shifter 40 is moved leftward, and the reverse drive ratio pinion 26 is driveably connected to input shaft 16 when shifter 40 is moved rightward. Similarly, third speed ratio pinion 46 is driveably connected to input shaft 16 when shifter 42 is moved leftward and the fifth speed ratio pinion 48 is connected to shaft 16 when shifter 42 is moved rightward.

The second speed ratio pinion 22 is journalled on the fourth input shaft 18 and the fifth speed ratio pinion 24 is journalled on a power take-off shaft 54 that extends outward from the clutch assembly 56. Pinion 22 is in continuous meshing engagement with output gear 30 and pinion 24 meshes with output gear 32, the gears being fixed to the output shaft 34. When shifter 44 is moved leftward, pinion 22 is driveably connected to shaft 18, and when shifter 44 is moved rightward, pinion 24 is driveably connected to shaft 18. Pinions 22, 24 and gears 30, 32 are associated with a second group of gear ratios.

The clutches 10, 12 are hydraulically actuated. The first of these 10, when engaged, connects the engine through shaft 14 to input shaft 16, and the second clutch, when engaged, connects the engine through shaft 14 to the second input shaft 18. The first and second clutches, therefore, are respectively associated with the first or second input shafts, and with a first or second group of gear ratios.

Figure 2A:
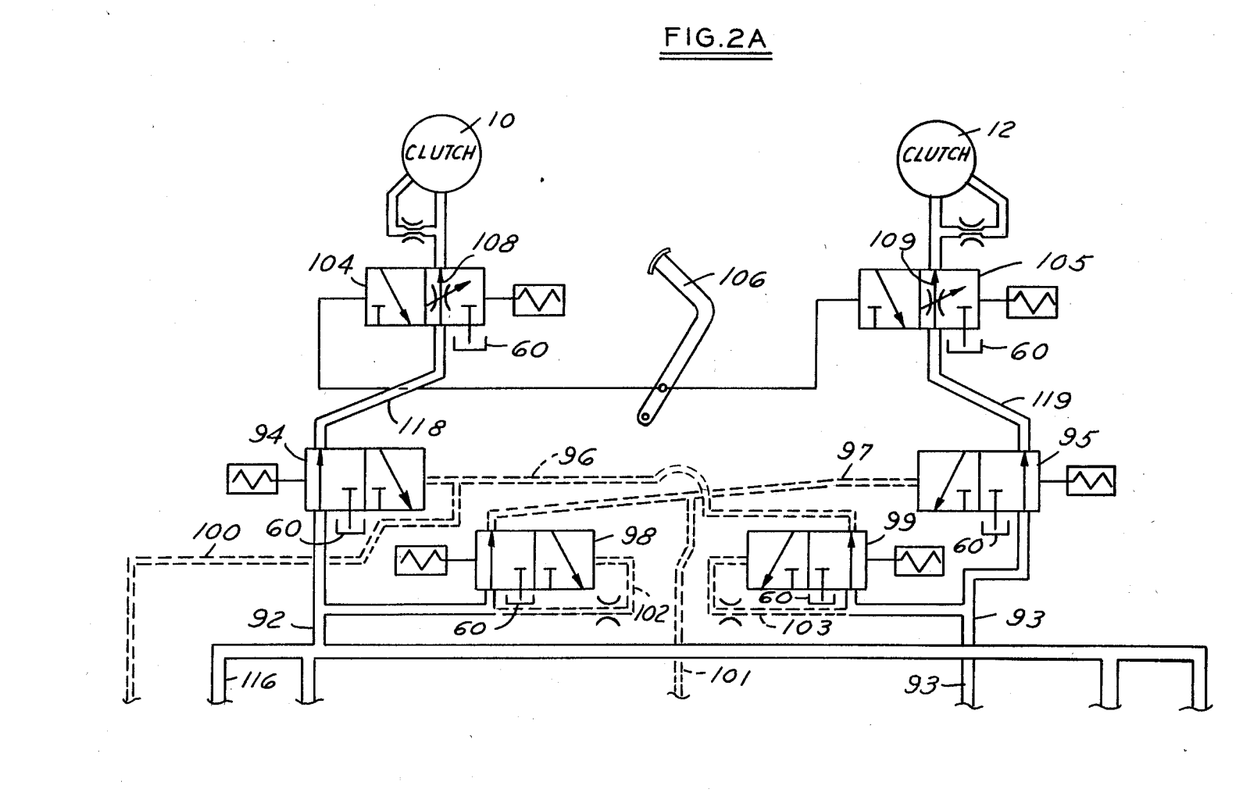
FIGS. 2A and 2B form a schematic diagram of a hydraulic system for controlling the operation of a transmission such as that of FIG. 1.
Figure 2B:
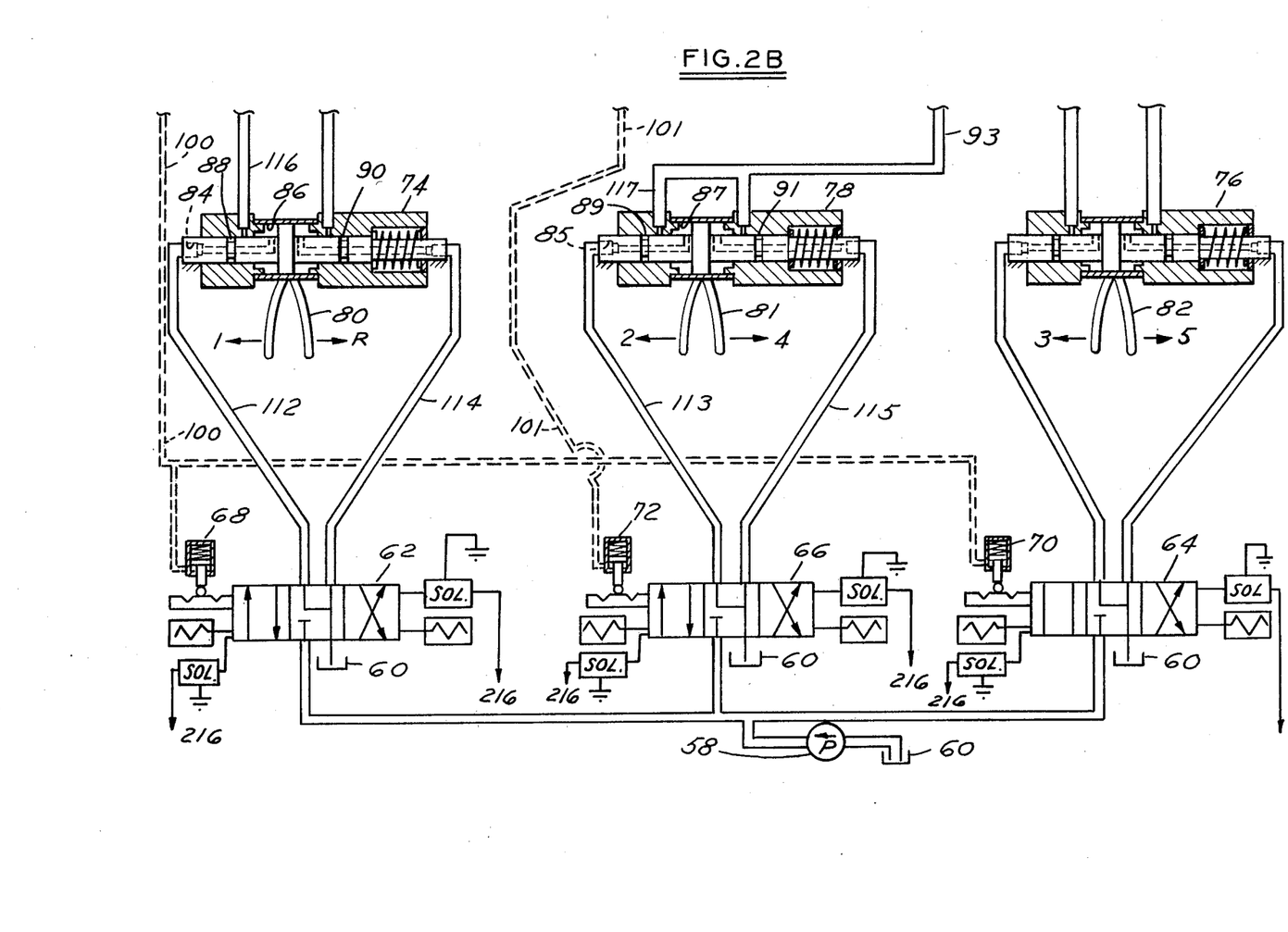

The shifters are actuated and the clutches engaged and disengaged through operation of a hydraulic control system shown in FIGS. 2A and 2B. With reference to those figures, the first and second clutches 10, 12 are pressurized by a hydraulic pump 58 whose inlet is connected to the hydraulic reservoir 60, the outlet being connected through hydraulic lines to three four-way, three-position, closed center valves 62, 64, 66. The valves are manually controlled through operation of a gear selector 216, such as that shown in FIG. 3B, which permits reverse drive to be engaged only from either the second gear ratio or fourth gear ratio positions. The valves are spring-centered and retained in position when the valves are moved leftward or rightward by spring-loaded, pressure-released detents 68, 70, 72.

Control valves 62, 64 are associated with the first actuator means, which include actuators 74, 76. The second control valve 66 is associated in a second actuator means that includes actuator 78. Each actuator has a piston that is fixed in position; a body portion having a sealed cylinder 86, 87 divided by the piston into first and second chambers on the left-hand side and right-hand side of the respective pistons, the body portion being movable along the axis of the piston. Each actuator body is biased by a spring to the center position shown in FIG. 2B and each actuator carries a shft fork 80, 81, 82, each fork engaging one of the shifters 40, 42, 44. Hydraulic fluid enters cylinder 86 through a bore 84 formed on the axis of the piston. Each bore has a radially directed port 88-91 through which a hydraulic line is pressurized as the actuator body is moved axially leftward and rightward when the cylinder is pressurized. For example, pressurized fluid is admitted to line 116 when shift fork 80 is moved far enough axially so that radial port 88 is brought into alignment with hydraulic line 116, through which line 92 is pressurized. Similarly, hydraulic line 93 is supplied with hydraulic fluid when actuator 78 is moved far enough leftward from the neutral position so that radial port 89 communicates with hydraulic line 117, through which line 93 is pressurized. Movement of the 3-5 actuator 76 connects line 92 to the pump outlet through control valve 64.

Lines 92 and 93 carry hydraulic fluid to first and second clutch valves 94, 95 which are three-way, two-position, spring-biased to the open center position direction control valves. These valves are shifted due to the action of pilot pressure carried in lines 96 and 97, respectively. Normally, valves 94, 96 are biased by a spring to the open-center position.

In parallel with valves 94, 95 are first and second pilot valves 98, 99 through which the clutch valves 94, 95, respectively, have pilot pressure applied. Pilot valves 98, 99 also direct pressure to the detent chamber of the control valves through lines 100 and 101, whereby a pressure force acts against the spring force of the detents to remove the locking force on the respective control valves. Pilot valves 98, 99 are biased by a spring to the open center position and are shifted to the closed center position by feedback pilot pressure carried in lines 102, 103.

In series with clutch valves 94, 95 are clutch pedal valves 104, 105, which are open-center, three-way, two-position direction control valves. These valves vent the clutches when the clutch pedal 106 is depressed, and provide a modulated pressure for smooth engagement as the clutch pedal is released due to the presence of a variable orifice 108, 109. Valves 104, 105 are biased by a spring to the open-center position whereby the clutch valves 94 and 95 communicate with clutches 10, 12.

In operation from start-up in the neutral position, after clutch pedal 106 is depressed, the gear ratio selector is moved to the first gear ratio position. When this is done, control valve 62 is moved rightward against the force of the centering springs, thereby connecting the pump outlet to actuator 74 through hydraulic line 112 and venting line 114 to the sump 60. When valve 62 is moved rightward, detent 68 engages and holds the valve at the first gear position. Cylinder 86, pressurized from line 112 and passage 84, moves the body of actuator 74 leftward causing shift fork 80 to move shifter 40 leftward, thereby producing a driveable connection between pinion 20 and input shaft 16. When the body of actuator 74 moves leftward sufficiently far, radial port 88 is brought into alignment with hydraulic line 116, and line 92 directs fluid to clutch valve 94 and to pilot valve 98. Clutch valve 94 directs fluid through line 118 to pedal valve 104 whose center is closed against the action of the centering spring by pedal 106 being depressed. As the clutch pedal is released, clutch 10 is pressurized from line 118 and the vehicle starts smoothly from a complete stop.

An upshift to the second gear ratio is made by moving the gear selector to the second gear ratio position.

This causes control valve 66 to move to the open inlet position, whereby the outlet of the pump is connected through valve 66 to cylinder 87 of actuator 78. Meanwhile, clutch 10 remains pressurized and actuator 74 remains in the first gear ratio position, locked in position by detent 68. As cylinder 87 is pressurized, the body of actuator 78 moves to the left causing shift fork 81 to move shifter 44 into engagement with pinion 22, thereby driveably connecting the pinion to input shaft 18. The outlet of the pump is connected through lines 117 and 93 to the inlet of pilot valve 99 and the inlet of clutch valve 95. As pressure in these lines increases to 75 psi., clutch 10 is vented to tank 60 through valve 104, line 118 and clutch valve 94, because a pressure force, developed on the spool of valve 94 due to the pilot pressure carried in line 96 from the pilot valve 94, overcomes the force of its spring and moves valve 94 to the closed inlet position where line 118 is connected to tank 60. As pressure in clutch 12 rises to 100 psi., the spring force in detent 68 is overcome by a pressure force resulting from a hydraulic fluid carried in line 100 from pilot valve 99. When detent 68 is released, control valve 62 returns to the center position where its inlet is closed and line 112 is connected to tank 60. This causes actuator 74 to return to the neutral position under the action of its centering spring and causes shift fork 80 to move shifter 40 so that pinion 20 is disconnected from the input shaft 16.

As pressure rises further in clutch 12 to 200 psi., pilot valve 99 is moved by a pressure force against the action of its bias spring to the position where its inlet is closed and its outlet is connected to tank. When this occurs, the pressure force on clutch valve 94 is relieved and that valve moves to its spring-centered position where clutch 10 is disconnected from tank and is ready to be pressurized through line 92 upon movement of actuators 74 and 76. The releasing pressure of detent 68 is removed and the detent is ready to lock valve 62 if it is moved by the gear selector.

In this way at relatively low pressure below 75 psi., hydraulic pressure causes the 2-4 actuator 78 to engage second gear and connects the outlet of the pump to the 2-4 clutch 12 while the first gear remains engaged and while the 1-3-5-R clutch 10 is engaged. Thereafter, as pressure rises to about 75 psi. in clutch 12, clutch 10 is drained. Later at about 100 psi., control valve 62 closes and actuator 74 is returned to the neutral position. Finally, at a still higher pressure, about 200 psi., the control valve through which the actuator outlet communicates with its associated clutch is opened. Hydraulic pressure increase in the lines that supply the clutch to be engaged as the cylinder of that clutch fills and its piston works against the force of the clutch return springs.

A downshift from the second gear ratio to the first gear ratio, which will be described next, is similar to a downshift from any speed ratio. First, the gear selector is moved from the second gear ratio position to the first gear ratio position. This causes control valve 62 to move to the position where the pump outlet is connected through line 112 to cylinder 86 of actuator 74. This causes shift fork 80 to move shifter 40 to the position where a driveable connection is made between pinion 20 and output shaft 16. When the body of actuator 78 has moved to the position where radial port 88 is aligned with line 116, the pump outlet is connected through line 92 and valves 94 and 104 to pressurize clutch 10. Meanwhile, clutch 12 remains engaged and actuator 78 remains in the second gear ratio position. As pressure in clutch 10 rises to 75 psi., pilot valve 98 directs fluid in line 97 to clutch valve 95, which moves against the force of its biasing spring to the position where its inlet is closed and clutch 12 is connected to tank through line 119. As pressure rises to 100 psi., detent 72 is released due to the effect of pressure force suplied to the detent through line 101 from pilot valve 98. As pressure in clutch 10 rises to 200 psi., a pressure force resulting from fluid pressure supplied in line 102 moves valve 98 to the closed center position, against the force of the centering spring, where line 97 is connected to tank, causing valve 95 to open.

When detent 72 is released, control valve 66 returns to the closed center position and lines 113, 115 are connected to tank. Actuator 78 is thereby depressurized and moves under the force of its centering spring to the neutral position. When this occurs, the outlet of pilot valve 99 is depressurized and detent 68 holds control valve 62 in the first gear ratio position.

Figure 3B:
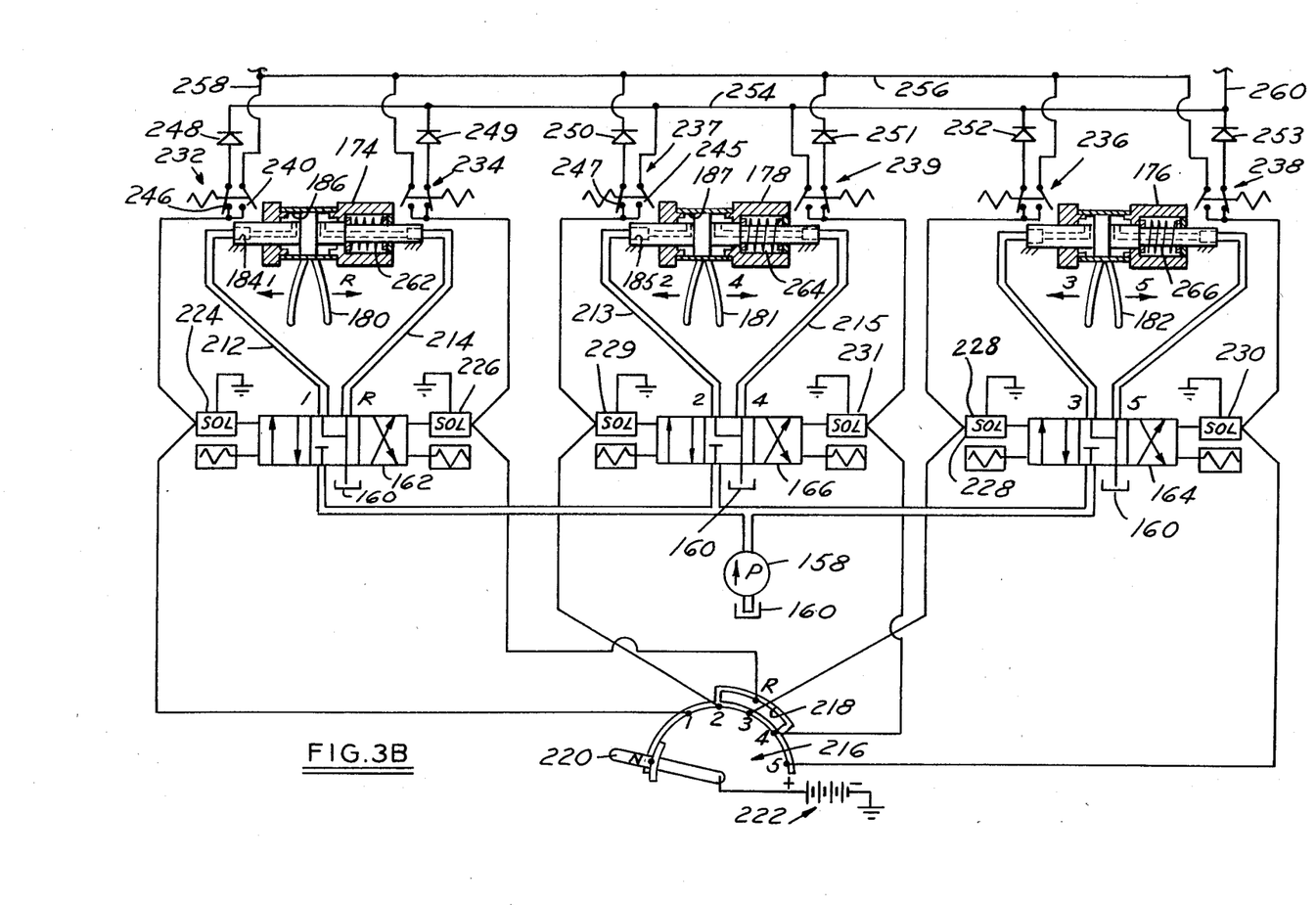

Referring now to FIGS. 3A and 3B, an electrohydraulic shift control system includes first control means, which include control valve 162 and 164 and second control means, which includes control 166. Valves 162, 164 and 166 are solenoid-actuated, spring-centered, three-position, four-way direction control valves. A pump 158, supplied with hydraulic fluid from tank or reservoir 160, is connected to the inlet of the control valves through which the pump is connected to first actuator means, which include actuator 174 and 176, and to second actuator means, which includes actuator 178.

A clutch pedal 206 actuates a clutch pedal valve 204 which is a spring-centered, three-way, two-position direction control valve that connects the outlet of the pump to first and second clutch valves 194 and 195 through hydraulic lines 218 and 219, respectively. Valves 194 and 195 are solenoid-actuated, spring-centered, three-way, two-position direction control valves connected respectively to a first clutch 210, whose engagement is required to produce the first, third, fifth and reverse drive ratios, and to a second clutch 212, whose engagement is required to produce the second and fourth speed ratios.

A gear selector 216 moves within a path defined by a gate 218 among five forward speed ratios, a reverse drive ratio and a neutral position. A gear selector arm 220, which is moved by the vehicle operator, connects the anode of a battery 222 to electrical connectors located in each of the drive ratio positions of the gear selector 216.

A first electrical line connects the first gear ratio position with a solenoid 224, which when energized moves valve 162 rightward to the first gear ratio position. A second electrical line connects the reverse drive terminal of the gear selector 216 to a solenoid 226, which when energized moves valve 162 leftward to the reverse drive ratio position. Similarly, solenoids 228-231 are connected to the terminals of the third, second, fifth and fourth gear ratio positions. When the windings of these solenoids are energized, they move the associated control valves to the selected gear ratio positions.

Actuator 174 has a shift fork 180 which engages shifter 40 and moves it between the first drive ratio position and reverse drive ratio position, whereby pinions 20 and 26 are selectively connected to input shaft 16. Actuator 176 carries a shift fork 182 which engages shifter 44 and moves it between third and fifth ratio positions, whereby pinions 22 and 24 are selectively connected to input shaft 18. Actuator 178 carries a shift fork 181, which engages shifter 42 and moves it between second and fourth speed ratio positions, whereby pinions 46 and 48 are selectively connected to input shaft 16.

At each end of the range of travel of actuators 174, 176, 178 is located a double-pole, single-throw, spring-loaded electrical switch 232–234. 236–238. Each switch has one normally open terminal through which the associated main control valve solenoid is connected to the solenoid that operates the valve through which the corresponding clutch is pressurized. For example, switch 232 has a normally open terminal 240 through which solenoid 224 can be connected to solenoid 242, which moves clutch valve 194 to the open-center position against the force of its spring. When solenoid 242 is energized, the pump outlet is connected through valve 204 to clutch 210. Similarly, switch 237 has a normally open terminal 245, through which solenoid 229 can be connected to solenoid 243, which moves clutch valve 195 to the open-center position. When solenoid 243 is energized, the pump outlet is connected through valve 195 to clutch 212.

Each switch includes a normally closed terminal that connects the associated control valve solenoid to the solenoid which operates the clutch valve for the clutch whose engagement is required to produce the gear ratios other than those of the associated control valve. For example, switch 232 includes a normally closed terminal 246 through which solenoid 224 is connected by conductor 260 to solenoid 243. Similarly, switch 237 includes a normally closed terminal 247 through which solenoid 229 is connected by conductor 258 to solenoid 242. Diodes 248–253 are included in series with the normally closed terminal in the circuit branches. As the body of actuator 174 approaches the switch 232, it closes terminal 240, thereby energizing solenoid 242, and it opens terminal 246, thereby de-energizing solenoid 243.

With the vehicle at rest and the transmission set for neutral operation, the first ratio is produced by depressing pedal 206 and moving the gear selector to the first gear ratio position. When the pedal is depressed, clutches 210, 212 are vented to tank 160 through valve 208. Selector 216 connects battery 222 to solenoid 224 which moves valve 162 rightward thereby connecting the pump outlet to actuator 174 through line 212 and bore 184. An electrical connection is made at terminal 246 of switch 232, whereby solenoid 243 is energized, which causes valve 195 to open. The body of actuator 174 moves leftward when cylinder 186 is pressurized and this moves shifter 40 leftward causing the first gear ratio engagement. As actuator 174 reaches the end of its stroke, it contacts the two-pole switch 232 closing terminal 240 and opening terminal 246. This energizes solenoid 242 and de-energizes solenoid 243. When the clutch pedal is released, hydraulic fluid from the pump outlet is metered through valve 204 to the 1-3-5-R clutch 210.

An upshift to the second gear ratio results when gear selector 216 is moved to the second ratio position. As the selector arm 220 is moved, the first gear ratio solenoid 224 remains energized, thus assuring that the transmission continues to operate in the first gear ratio until the second gear ratio is produced. When the gear selector moves to the second gear ratio position, solenoid 229 is energized and the normally closed terminal 247 of switch 237 conducts electrical current through diode 250 to solenoid 242.

Similarly, solenoid 224 is energized by way of two paths, one path supplying electrical current when the gear selector is in the first gear position, the second path supplying electrical current when the gear selector is in the second gear position. In the first gear ratio position, solenoid 224 is energized from the battery by way of the circuit branch that includes terminal 240 of switch 232, solenoid 242 and its grounded connection. When gear selector 216 is in the second gear ratio position, and while actuator 174 is in the first gear ratio position, solenoid 242 is energized through the circuit branch that includes battery 222, solenoid 229, terminal 247 of switch 237 and terminal 240 of switch 232.

When solenoid 229 of the second control valve 166 is energized by moving gear selector 216 to the second gear position, valve 166 is moved rightward to the open center position thereby connecting the pump outlet through line 213 and bore 185 to cylinder 187 of actuator 178. This causes the actuator body to move leftward which causes shift fork 181 to move shifter 44 leftward, thereby connecting pinion 22 to input shaft 18. As actuator 178 nears the end of its travel, it closes terminal 245 and opens terminal 247. This closes the circuit branch that includes battery 222, switch 237, conductors 254, 260 and solenoid 243, and opens the circuit branch that includes the battery, conductors 256 and 258 and solenoid 242. When solenoid 243 is energized, second clutch 212 is engaged because its control valve 195 is moved to the open-center position. When solenoid 242 is de-energized in this way, first clutch 210 is vented to tank because the bias spring of valve 194 moves the valve to the closed center position. When terminal 247 is opened, the circuit branch that includes the battery, switch 237, terminal 240 of switch 232 and solenoid 224 is opened. This causes control valve 162 to return to the center position under the action of its centering spring, thereby closing communication between the pump outlet and cylinder 186 of actuator 174. The actuator is drained through lines 212 and 214 to tank when control valve 162 is centered and actuator 174 is returned to the neutral position due to the centering action of the spring 262. Actuators 278 and 276 have centering springs 264 and 266, respectively. When actuator 174 is centered, switches 232 and 234 return to the position shown in FIG. 3B.

Having described several forms of my invention, what I claim and desire to secure by U.S. Letters Patent is:

1. A system for controlling the operation of a vehicular transmission having first and second shafts, each shaft being associated with a first or a second group of selectable gear ratios comprising:
   gearing defining multiple torque delivery paths, including multiple pairs of gears for producing multiple gear ratios;
   a gear selector movable among first and second groups of gear ratio positions;
   a source of pressurized hydraulic fluid;
   first and second clutches for transmitting power alternatively to the first and second shafts as the respective clutches are pressurized, each clutch being associated with a first or second group of gear ratios;
   first and second actuator means each movable, when connected to the fluid pressure source, from a neutral position to gear ratio producing positions for driveably connecting the gearing to the first shaft or second shaft for operation in the selected gear ratio, the first actuator means being associated with the first group of gear ratios, the second actuator means being associated with the second group of gear ratios;

first control valve means for connecting the fluid pressure source to the first actuator means when the gear selector is moved to any of the first group of gear ratio positions;

second control valve means for connecting the fluid pressure source to the second actuator means when the gear selector is moved to any of the second of gear ratio positions;

first clutch valve means for connecting the fluid pressure source to the first clutch when the first actuator means has moved to a gear ratio producing position; and second clutch valve means for connecting the fluid pressure source to the second clutch when the second actuator means has moved to a gear ratio producing position.

2. The system of claim 1 further comprising means responsive to control of the vehicle operator for venting the clutches and for opening communication between the clutches and the first and second clutch valve means.

3. The system of claim 1 wherein the first and second clutch valve means have means for venting their respective clutches and further comprising:

first pilot valve means connected to the second clutch valve for venting the second clutch when the pressure in the first clutch rises to a first pressure; and second pilot valve means connected to the first clutch valve for venting the first clutch when the pressure in the second clutch rises to a first pressure.

4. The system of claim 1 further comprising:

first and second detent means for holding the first and second control valve means in the position to which said control valve means are moved by the gear selector;

means for releasing said detent means;

first pilot valve means for releasing the second detent means when the pressure in the first clutch rises to a second pressure; and second pilot valve means for releasing the first detent means when the pressure in the second clutch rises to a second pressure.

5. The system of claim 3 wherein the first pilot valve means connects the second clutch to the fluid pressure source when the pressure in the first clutch rises to a third pressure greater than the first pressure and wherein the second pilot valve means connects the first clutch to the fluid pressure source when the pressure in the second clutch rises to a third pressure greater than the first pressure.

6. The system of claim 1 wherein each of the first actuator means comprises:

first and second chambers each associated with a gear ratio of the first group of gear ratios selectively connected to the fluid pressure source when the gear selector is moved to the gear ratio position corresponding to said chamber;

an actuator that moves linearly from the neutral position to the gear ratio producing position in response to one of said chambers being connected to the fluid pressure source;

first and second outlet ports brought into communication with the fluid pressure source when the actuator moves to the selected gear ratio producing position, said outlet ports being connected to the first clutch valve means.

7. The system of claim 1 wherein the second actuator means comprises:

first and second chambers each associated with a gear ratio of the second group of gear ratios selectively connected to the fluid pressure source when the gear selector is moved to the gear ratio position corresponding to said chamber;

an actuator that moves linearly from the neutral position to the gear ratio producing position in response to one of said chambers being connected to the fluid pressure source;

first and second outlet ports brought into communication with the fluid pressure source when the actuator moves to the selected gear ratio producing position, said outlet ports being connected to the second clutch valve means.

8. A system for controlling the operation of a vehicular transmission having first and second shafts, each shaft being associated with a first or a second group of selectable gear ratios comprising:

gearing defining multiple torque delivery paths including multiple pairs of gears for producing multiple gear ratios;

a gear selector movable among various gear ratio positions;

a source of pressurized hydraulic fluid;

first and second clutches for transmitting power alternately to the first and second shafts as the respective clutches are pressurized, each clutch being associated with a first or second group of gear ratios;

first and second actuator means each movable from a neutral position to gear ratio producing positions for driveably connecting the gearing to an associated shaft for operation in the selected gear ratio, the first actuator means being associated with the first group of gear ratios, the second actuator means being associated with the second group of gear ratios;

first control valve means for connecting the fluid pressure source to the first actuator means when the gear selector is moved to any of the first group of gear ratio positions;

second control valve means for connecting the fluid pressure source to the second actuator means when the gear selector is moved to any of the second group of gear ratio positions;

first means for maintaining the connection of the fluid pressure source to the first actuator means after the gear selector is moved to any of the second group of gear ratio positions;

second means for maintaining the connection of the fluid pressure source to the second actuator means after the gear selector is moved to any of the first group of gear ratio positions;

first clutch valve means for connecting the fluid pressure source to the first clutch when the first actuator means has moved to a gear ratio producing position; and second clutch valve means for connecting the fluid pressure source to the second clutch when the second actuator means has moved to a gear ratio producing position.

9. The system of claim 8 further comprising means responsive to the control of the vehicle operator for venting the clutches and for opening communication between the fluid pressure source and the first and second clutch valve means.

10. The system of claim 8 further comprising:
first means for disconnecting the fluid pressure source from the first actuator means after the second actuator means has moved to a gear ratio producing position; and
second means for disconnecting the fluid pressure source from the second actuator means after the first actuator means has moved to a gear ratio producing position.

11. A system for controlling operation of a transmission comprising:
a gear selector movable among various gear ratio positions, the positions being associated with a first group or a second group of selectable gear ratios;
a source of pressurized hydraulic fluid;
first and second clutches engaged by being connected to the fluid pressure source and disengaged by being vented, the first clutch being associated with a first group of gear ratios, the second clutch being associated with a second group of gear ratio positions;
a first actuator responsive to hydraulic pressure applied to a first chamber thereof for moving to a first position corresponding to a first gear ratio among the first group of gear ratios and for moving to a second position corresponding to a second gear ratio among the first group of gear ratios when hydraulic pressure is applied to a second chamber thereof;
a second actuator responsive to hydraulic pressure applied to a first chamber thereof for moving to a first position corresponding to a first gear ratio among the second group of gear ratios and for moving to a second position corresponding to a second gear ratio among the second group of gear ratios when hydraulic pressure is applied to a second chamber thereof;
a first control valve connected to the fluid pressure source movable to first and second positions as the gear selector is moved, adapted to connect the fluid pressure source to the first chamber of the first actuator when the gear selector is moved to the first gear ratio position of the first group of gear ratios and to connect the fluid pressure source to the second chamber of the first actuator when the gear selector is moved to the second gear ratio position of the first group of gear ratios; and
a second control valve connected to the fluid pressure source movable to first and second positions as the gear selector is moved, adapted to connect the fluid pressure source to the first chamber of the second actuator when the gear selector is moved to the first gear ratio position of the second group of gear ratios and to connect the fluid pressure source to the second chamber of the second actuator when the gear selector is moved to the second gear ratio position of the second group of gear ratios.

12. The system of claim 11 further comprising:
an electrical power source;
connector means for connecting the electrical power source to any of the gear selector positions to which the gear selector is moved;
first solenoid means electrically connected to the first and second gear ratio positions of the first group of gear ratios of the gear selector, adapted to move the first control valve to its first and second positions in accordance with the gear selector being moved to either of said positions; and
second solenoid means connected to the first and second gear ratio postions of the second group of gear ratios of the gear selector, adapted to move the second control valve to its first and second positions in accordance with the gear selector being moved to either of said positions.

13. The system of claim 11 further comprising:
first clutch valve means connected to the fluid pressure source having a first state at which the first clutch is vented, a second state at which the first clutch is connected to the pressure source, and a solenoid that produces the second state upon its being energized;
a second clutch valve means connected to the fluid pressure source having a first state at which the second clutch is vented, a second state at which the second clutch is connected to the pressure source, and a solenoid that produces the second state upon its being energized;
first switch means electrically connected to the first solenoid means having a normally open terminal connectable to the solenoid of the first clutch valve means and a normally closed terminal connectable to the solenoid of the second clutch valve means, the normally open terminal being closed when the first actuator moves to its first or second positions, the normally closed terminal being opened when the first actuator moves to its first or second positions; and
second switch means connected to the second solenoid means having a normally open terminal connectable to the normally closed terminal of the first switch means and to the solenoid of the second clutch valve means, having a normally closed terminal connectable to the normally open terminal of the first switch means and to the solenoid of the first clutch valve means, the normally open terminal being closed by movement of the second actuator to its first or second positions.

14. The system of claim 13 further comprising:
means located in the electrical line that connects the normally closed terminal of the first switch means to the normally open terminal of the second switch means for preventing flow of electrical current except in the direction from the first solenoid means to the solenoid of the second clutch valve means.

15. The system of claim 13 further comprising:
means located in the electrical line that connects the normally closed terminal of the second switch means to the normally open terminal of the first switch for preventing flow of electrical current except in the direction from the second solenoid means to the solenoid of the first clutch valve means.

* * * * *